JANE ANN BRYANT.
Devices for Removing Snow from Railways.
No. 145,623.                Patented Dec. 16, 1873.

WITNESSES
C. F. Brown
Melinda Church, By

INVENTOR
Jane Ann Bryant
Will & Ellsworth
her Attorneys.

UNITED STATES PATENT OFFICE.

JANE ANN BRYANT, OF POTTSVILLE, PENNSYLVANIA.

IMPROVEMENT IN DEVICES FOR REMOVING SNOW FROM RAILWAYS.

Specification forming part of Letters Patent No. 145,623, dated December 16, 1873; application filed November 12, 1873.

*To all whom it may concern:*

Be it known that I, JANE ANN BRYANT, of Pottsville, in the county of Schuylkill and State of Pennsylvania, have invented a new and useful Improvement in Snow-Wheels; and I do hereby declare the following specification to be a full, clear, and exact description thereof, reference being had to the accompanying drawing, which forms a part of this specification.

My invention relates to the class of wheels or shovels such as are used for removing snow from railroad-tracks or streets; and the object of the invention is to produce a more practical and thoroughly working device than has heretofore been made, and one that is simple in construction and not easy to get out of order, and that can be adjusted to and operated by any vehicle where a horizontal rotary motion can be communicated to it.

Figure 1:
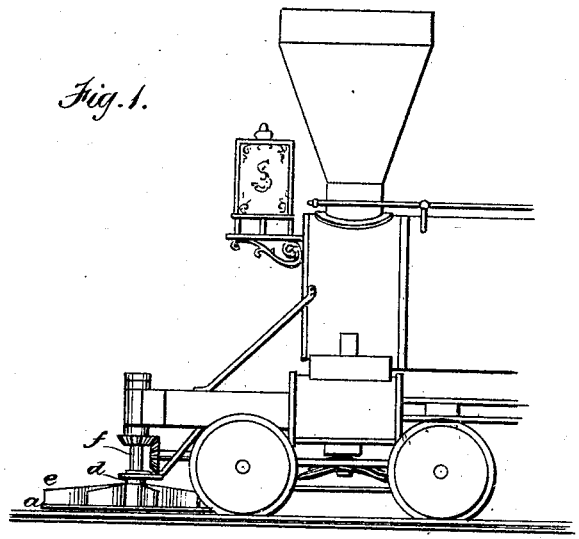
Figure 2:
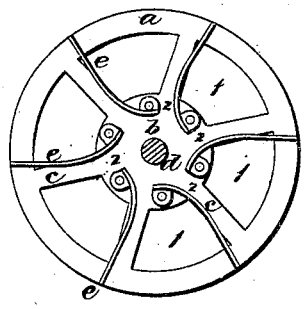

Figure 1 is a side view of my wheel as applied to a locomotive-engine. Fig. 2 is a top view of my wheel.

$a$ is the rim of the wheel, and $b$ is the base, connected by means of the flat spokes $c$. Rising from the base $b$ is the hollow stem $d$, in which any shaft may be placed and secured by well-known means to rotate my wheel.

The foregoing-named parts are made integral; but it is evident that they may be made separate, and bolted or screwed together in any ordinary way, without changing the character of my wheel or invention.

$e$ are the paddles or flukes of the wheel, which are rigidly or adjustably attached to the base and rim of the wheel, as shown in Fig. 2. They rise vertically from the wheel, and are all curved in the same direction, for the reasons hereinafter set forth. $f$ is the central shaft, the lower end of which is held tightly in the socket $d$ of the wheel. By means of this shaft the wheel is supported a slight distance above the track to be cleaned of snow, and rotary motion is applied to it, either through the ordinary gearing, as shown, or by a band and pulleys.

In operation, the wheel turns from left to right, and as it is carried along the forward spaces between the paddles become filled with snow, and the form of these paddles is just such as will take the snow and throw it laterally, and thus discharge it at the proper point and time to produce the best results with the least power.

The spaces 1 are of considerable advantage, for they allow the wheel to clear itself, as will be found in practice; also, the ways 2 assist in producing the same end.

I do not wish to limit myself to any particular means for carrying or rotating my wheel, for it is evident that such is not material to the operation of my invention.

What I claim, and desire to secure by Letters Patent of the United States, is—

The snow-wheel consisting of the base $b$, rim $a$, paddles $e$, spokes $c$, and socket $d$, constructed as described, for the purpose set forth.

JANE ANN BRYANT.

Witnesses:
DAN. L. KREBS,
JOHN HERBERT.